United States Patent
Kim

(10) Patent No.: US 9,846,455 B2
(45) Date of Patent: Dec. 19, 2017

(54) DISPLAY DEVICE

(71) Applicant: SAMSUNG DISPLAY CO., LTD., Yongin, Gyeonggi-Do (KR)

(72) Inventor: Yun Jae Kim, Cheonan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 75 days.

(21) Appl. No.: 14/645,324

(22) Filed: Mar. 11, 2015

(65) Prior Publication Data

US 2016/0054823 A1    Feb. 25, 2016

(30) Foreign Application Priority Data

Aug. 19, 2014  (KR) .......................... 10-2014-0107619

(51) Int. Cl.
*G06F 1/16* (2006.01)
(52) U.S. Cl.
CPC .................................. *G06F 1/1643* (2013.01)
(58) Field of Classification Search
CPC .................................................... G06F 1/1643
See application file for complete search history.

(56) References Cited

U.S. PATENT DOCUMENTS

| | | | |
|---|---|---|---|
| 2011/0175846 A1* | 7/2011 | Wang | G06F 3/044 345/174 |
| 2011/0285640 A1* | 11/2011 | Park | G02F 1/13338 345/173 |
| 2012/0146919 A1 | 6/2012 | Kim et al. | |
| 2013/0148051 A1 | 6/2013 | Kim | |
| 2013/0188103 A1* | 7/2013 | Jeng | G06F 3/041 349/12 |
| 2013/0241863 A1* | 9/2013 | Walden | G06F 3/044 345/174 |
| 2014/0028583 A1 | 1/2014 | Cho | |
| 2014/0092034 A1* | 4/2014 | Franklin | G09F 13/0413 345/173 |

FOREIGN PATENT DOCUMENTS

| | | |
|---|---|---|
| KR | 10-2012-0065008 | 6/2012 |
| KR | 10-2013-0078143 | 7/2013 |
| KR | 10-2014-0013615 | 2/2014 |

* cited by examiner

*Primary Examiner* — Aneeta Yodichkas
(74) *Attorney, Agent, or Firm* — Lewis Roca Rothgerber Christie LLP

(57) ABSTRACT

A display device includes a display panel, a touch sensor on the display panel, a window on the touch sensor, an adhesive layer between the window and the touch sensor, a touch key printed circuit board at least partially located between the window and the display panel, a touch key backlight unit on the touch key printed circuit board, and a shielding layer between the touch key printed circuit board and the display panel.

13 Claims, 4 Drawing Sheets

DISPLAY DEVICE

CROSS-REFERENCE TO RELATED APPLICATION

This application claims priority to and the benefit of Korean Patent Application No. 10-2014-0107619, filed on Aug. 19, 2014, and all the benefits accruing therefrom under 35 U.S.C. §119, the entire content of which is incorporated by reference.

BACKGROUND

1. Field

Aspects of embodiments of the present invention relate to a display device.

2. Description of the Related Art

In general, flat panel displays, such as liquid crystal displays and organic light emitting diode displays, include a plurality of pairs of electric field generating electrodes and an electro-optical active layer interposed therebetween. In the liquid crystal display, a liquid crystal layer is included as the electro-optical active layer, and in the organic light emitting diode display, an organic light emitting layer is included as the electro-optical active layer.

One of a pair of electric field generating electrodes is generally coupled to (e.g., connected to) a switching element so as to receive an electric signal. The electro-optical active layer converts the electric signal into an optical signal so that an image is displayed.

Such flat panel displays have a structure in which a protective window is formed on a panel on which the image is realized. The panel and the window are bonded to each other by an adhesive layer.

Sometimes, when the window and the panel are bonded to each other, an adhesive material used as the adhesive layer can infiltrate into a touch key area. Further, the adhesive material can flow into a touch key backlight unit in the touch key area. In this case, the touch key backlight unit may fail to work properly, and thus the touch key area cannot be provided with light.

It is to be understood that this background of the technology section is intended to provide useful background for understanding the here disclosed technology and as such, the technology background section may include ideas, concepts or recognitions that were not part of what was known or appreciated by those skilled in the pertinent art prior to corresponding effective filing dates of subject matter disclosed herein.

SUMMARY

Aspects of embodiments of the present invention are directed toward a display device that can effectively prevent or reduce penetration of an adhesive material into a touch key backlight unit when a window is bonded to a panel.

According to an embodiment of the present invention, a display device includes a display panel, a touch sensor on the display panel, a window on the touch sensor, an adhesive layer between the window and the touch sensor, a touch key printed circuit board at least partially (at least in part) located between the window and the display panel, a touch key backlight unit on the touch key printed circuit board, and a shielding layer between the touch key printed circuit board and the display panel.

The display device may further include an adhesive member between the shielding layer and the touch key printed circuit board.

The shielding layer may include polyethylene terephthalate.

The display device may further include a cover tape on the shielding layer and on the touch key backlight unit.

The touch key backlight unit may include a light source, a light guide plate configured to receive light emitted from the light source on one surface thereof and to emit the light through the opposite surface thereof, an optical sheet on the light guide plate, and a reflective sheet under the light guide plate.

The shielding layer may have a larger length than the light guide plate.

The shielding layer may have a larger thickness than the adhesive layer.

The display device may further include a polarizer between the display panel and the window.

The display panel may include a first substrate including a display area and a non-display area, a second substrate opposite the first substrate, and a display unit between the first and second substrates.

The display unit may include any one of a liquid crystal and an organic light emitting element.

The touch sensor may be patterned on the second substrate.

The touch sensor may be located on the second substrate.

According to aspects of embodiments of the present invention, a display device includes a shielding layer. The shielding layer may be located between an adhesive layer and a touch key backlight unit, thereby reducing penetration of an adhesive material into a touch key printed circuit board and the touch key backlight unit. Accordingly, malfunction of the touch key backlight unit, which is caused by the adhesive material, may also be reduced or effectively prevented.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The above and other features and aspects of the present invention will be more clearly understood from the following detailed description taken in conjunction with the accompanying drawings, in which.

DETAILED DESCRIPTION

Figure 1:
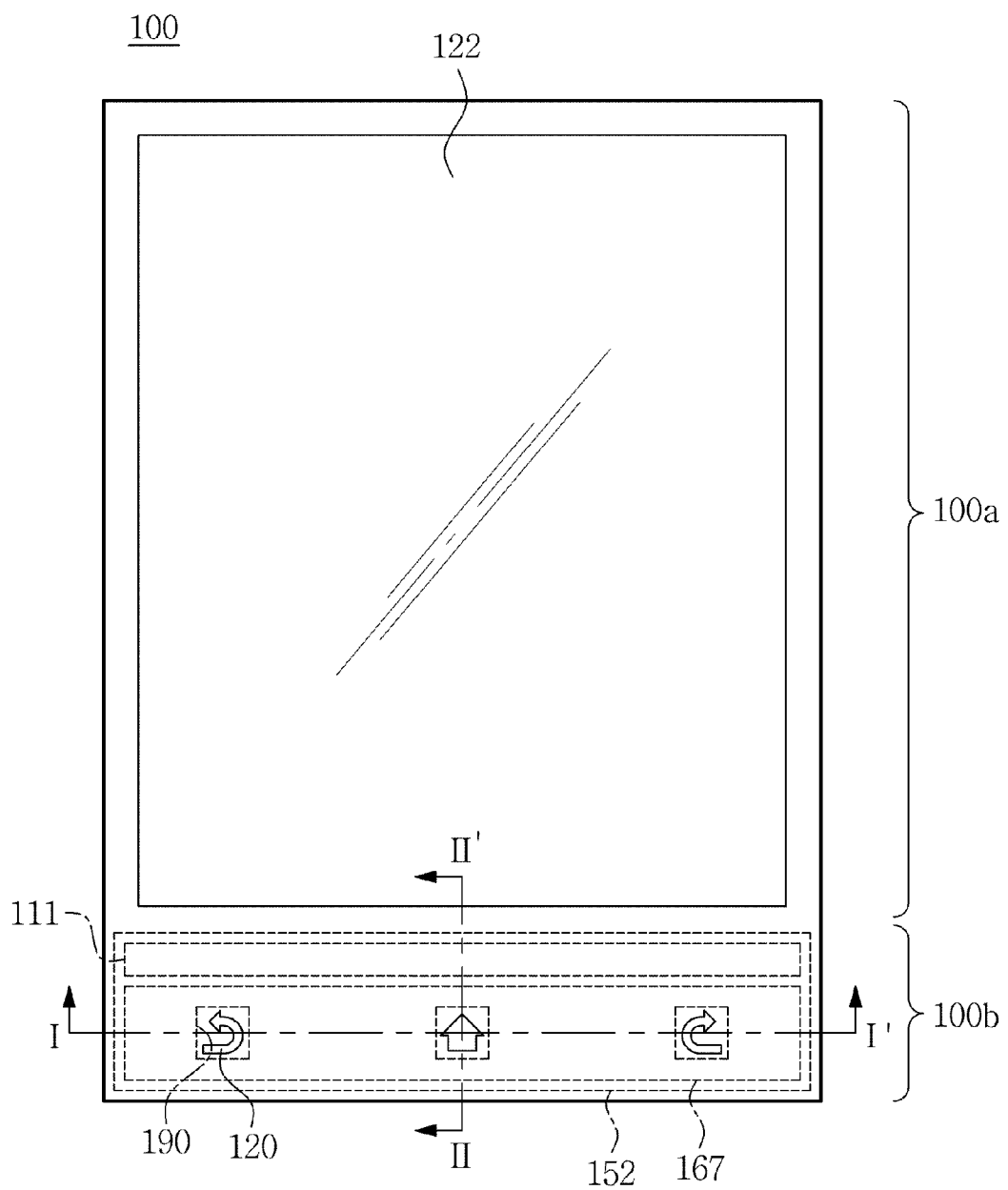
FIG. 1 is a view illustrating a front surface of a window in a display device according to an embodiment of the present invention.

Characteristics and features of the present invention and methods for achieving them will be made clear from embodiments described below in detail with reference to the accompanying drawings. The present invention may, however, be embodied in many different forms and should not be construed as being limited to the embodiments set forth herein. Rather, these embodiments are provided so that this disclosure will be thorough and complete and will fully convey the scope of the invention to those skilled in the art. However, the present invention should not be limited to the embodiments described herein. Well-known constituent elements, operations, and techniques are not described in detail in the embodiments in order to prevent the present invention from being obscurely interpreted. Like reference numerals refer to like elements throughout the specification.

The spatially relative terms, such as "below", "beneath", "lower", "above", "upper", and the like, may be used herein for ease of description to describe the relationship between one element or component and another element or component as illustrated in the drawings. It will be understood that the spatially relative terms are intended to encompass different orientations of the device in use or operation, in addition to the orientation depicted in the drawings. For example, when a device shown in the drawing is turned over, a device positioned "below" or "beneath" another device would then be "above" another device. Accordingly, the illustrative term "below" may include both the lower and upper positions. The device may also be oriented in any other direction, and thus, the spatially relative terms may be interpreted differently depending on the orientations.

The terminology used herein is for the purpose of describing particular embodiments only and is not construed as limiting the invention. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of the mentioned component, step, operation, and/or element but do not exclude the presence or addition of one or more additional components, steps, operations, and/or elements. Further, the use of "may" when describing embodiments of the present invention refers to "one or more embodiments of the present invention."

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Figure 2:
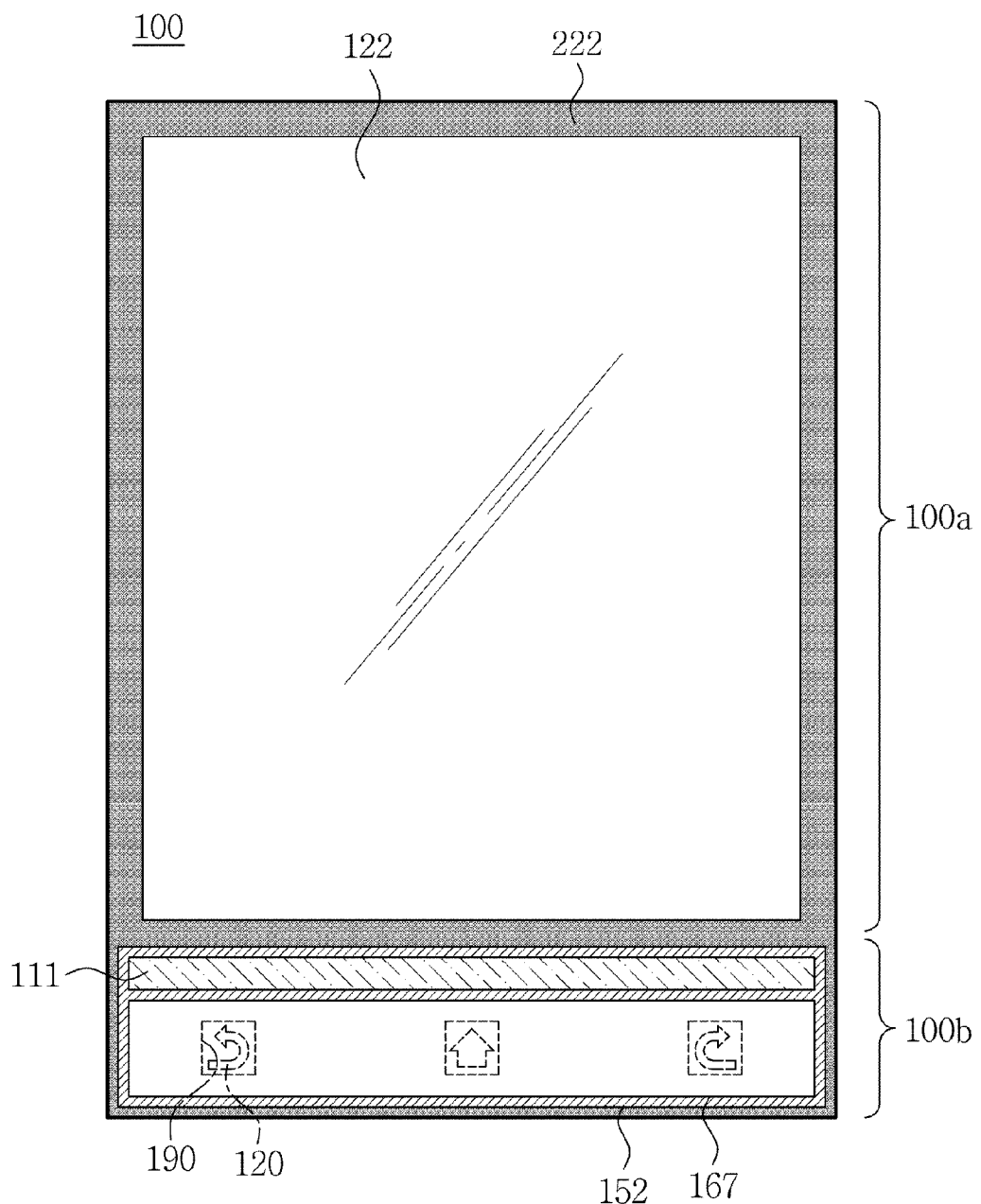
FIG. 2 is a view illustrating a rear surface of the window illustrated in FIG. 1.

FIG. 1 is a view illustrating a front surface of a window in a display device according to an embodiment of the present invention. FIG. 2 is a view illustrating a rear surface of the window illustrated in FIG. 1.

As illustrated in FIG. 1, the window 100 may be partitioned into two areas: a display area 100a and a touch key area 100b. A display window 122 may be located in the display area 100a and touch icons 120 may be located in the touch key area 100b.

The window 100 may be made of a transparent glass material. In this case, a light shielding material 222 may be printed on all regions except for the display window 122 and the touch icons 120. In more detail, as illustrated in FIG. 2, the light shielding material 222 may be printed on all regions except for the display window 122 and the touch icons 120 on the rear surface of the window 100. Therefore, light leakage from all regions except for the display window 122 and the touch icons 120 may be reduced.

In one embodiment, the light shielding material 222 may be formed on the front surface of the window 100 instead of the rear surface thereof. The light shielding material 222 may also be printed on all regions except for the display window 122 and the touch icons 120 on the front surface of the window 100.

The light shielding material 222 may be black or may have a specific color that enables a light shielding function.

A touch key printed circuit board (PCB) 152 and a touch key backlight unit 167 may be located on the rear surface of the window 100 corresponding to the touch key area 100b.

The touch key PCB 152 and the touch key backlight unit 167 will be described in detail with reference to FIG. 3.

Figure 3:
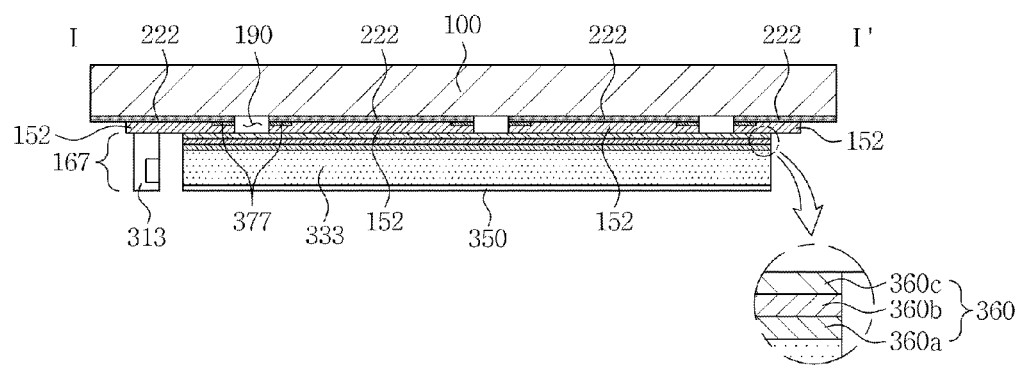
FIG. 3 is a cross-sectional view taken along line I-I' of FIG. 1.

FIG. 3 is a cross-sectional view taken along line of FIG. 1.

As illustrated in FIG. 3, the touch key backlight unit 167 may include a light source 313, a light guide plate 333, a reflective sheet 350, and an optical sheet 360.

The light source 313 may emit light and may be mounted on the touch key PCB 152. In detail, the light source 313 may be mounted on a rear surface of the touch key PCB 152. Herein, the rear surface of the touch key PCB 152 may be located opposite a front surface of the touch key PCB 152. In one embodiment, the front surface of the touch key PCB 152 may face the touch key area 100b of the window 100. More specifically, the front surface of the touch key PCB 152 may face the light shielding material 222 formed on the window 100.

The light source 313 may be an emission package that includes at least one light emitting diode ("LED"). In an exemplary embodiment, for instance, one emission package may include a red LED generating and emitting red light, a green LED generating and emitting green light, and a blue LED generating and emitting blue light. The emission package may produce white light by combining (or mixing) the three colors. In another exemplary embodiment, the emission package may include only the blue LED among the LEDs of the three colors and a phosphor may be located in a light emitting unit of the blue LED so as to convert the generated blue light to white light. Light emitted from the light source 313 may be incident on the light guide plate 333.

The light guide plate 333 may be located on the rear surface of the touch key PCB 152. The light guide plate 333 may have a shape of polyhedron. Among a plurality of surfaces of the light guide plate 333, one surface facing the light source 313 may be set as a light incident (side) surface. Light emitted from the light source 313 may be incident on the light incident surface of the light guide plate 333, and then, the light may propagate inside the light guide plate 333. The light guide plate 333 may guide the light to the touch icons 120 using total internal reflection. In one embodiment, a plurality of scattering patterns may be further located on a lower outside surface of the light guide plate 333 so as to increase reflectivity of the light guide plate 333. The distance between the scattering patterns may become larger as the scattering patterns are located farther from the light incident surface of the light guide plate 333 in the top plan view.

The light guide plate 333 may include a light-transmissive material, e.g., an acrylic resin such as polymethylmethacrylate ("PMMA") or polycarbonate ("PC"), to guide light efficiently.

The reflective sheet 350 may be located under the light guide plate 333. The reflective sheet 350 may reflect light passing through the lower outside surface of the light guide plate 333 and emitted outwards back into the light guide plate 333, thereby reducing (or minimizing) light loss. The reflective sheet 350 may be made of, for example, polyethylene terephthalate (PET) having reflective properties, and one surface of the reflective sheet 350 may be coated with a diffusion layer containing, for example, titanium dioxide. Further, the reflective sheet 350 (RS) may be made of a material containing a metal such as silver (Ag).

The optical sheet 360 may diffuse and collimate light received from the light guide plate 333 and may be located between the light guide plate 333 and the touch key area 100b of the window 100. The optical sheet 360 may include a diffusion sheet 360a, a prism sheet 360b and a protective sheet 360c, but the invention is not limited thereto. The diffusion sheet 360a, prism sheet 360b and protective sheet 360c may be sequentially located such as to be laminated on the light guide plate 333 (LGP) in the order in which they are enumerated.

The diffusion sheet 360a may diffuse light received from the light guide plate 333 to prevent the light from being partially concentrated.

The prism sheet 360b may be located on the diffusion sheet 360a to collimate light diffused from the diffusion sheet 360a in a direction perpendicular to the window 100. To this end, the prism sheet 360b may have triangular prisms on one surface thereof.

The protective sheet 360c may be located on the prism sheet 360b to protect a surface of the prism sheet 360b and diffuse light to obtain uniformly distributed light. Light passing through the protective sheet 360c may be supplied to the touch icons 120 in the touch key area 100b of the window 100.

In this case, an adhesive member made of a transparent material may be located between the window 100 and the optical sheet 360, between the optical sheet 360 and the light guide plate 333, and between the light guide plate 333 and the reflective sheet 350.

The touch key PCB 152 may include touch electrodes 377 configured to detect an external touch transmitted through the touch icons 120 and also include at least one wire pattern configured to transmit driving power, which is externally supplied, to the touch key backlight unit 167. In one embodiment, the touch key PCB 152 may further include a power supply unit configured to generate the driving power.

Flexible printed circuits may be used as the touch key PCB 152.

In one embodiment, as illustrated in FIGS. 2 and 3, transmission holes 190 may be defined in the touch key PCB 152 therethrough. The transmission holes 190 may be located corresponding to the touch icons 120. The respective transmission holes 190 may be large enough to surround the touch icons 120 corresponding thereto. Light produced from the touch key backlight unit 167 may be incident on the touch icons 120 through the transmission holes 190. Then, light with shapes of the touch icons 120 may be emitted outside the window 100.

As illustrated in FIG. 3, the touch electrodes 377 may be located around the transmission holes 190 so as to surround the transmission holes 190. The touch electrodes 377 may detect touch performed on the corresponding touch icon 120.

The touch electrodes 377 may be located on the front surface of the touch key PCB 152. As illustrated in FIG. 3, the touch electrodes 377 may also be located in a groove defined in the front surface of the touch key PCB 152.

The touch electrodes 377 and the light source 313 may be connected to a wire in the touch key PCB 152 to be connected to a touch panel PCB that will be described below.

In one embodiment, as illustrated in FIGS. 1 and 2, a shielding layer 111 may be located on the rear surface of the touch key PCB 152. The shielding layer 111 may reduce or effectively prevent infiltration of an adhesive material used when the window 100 is laminated with a display panel that is located under the window 100 into the touch key PCB 152 and the touch key backlight unit 167. To this end, the shielding layer 111 may be located between an adhesive layer and the touch key backlight unit 167. In this case, the shielding layer 111 may be located on the touch key PCB 152.

A location of the shielding layer 111 will be described in detail with reference to FIG. 4.

Figure 4:
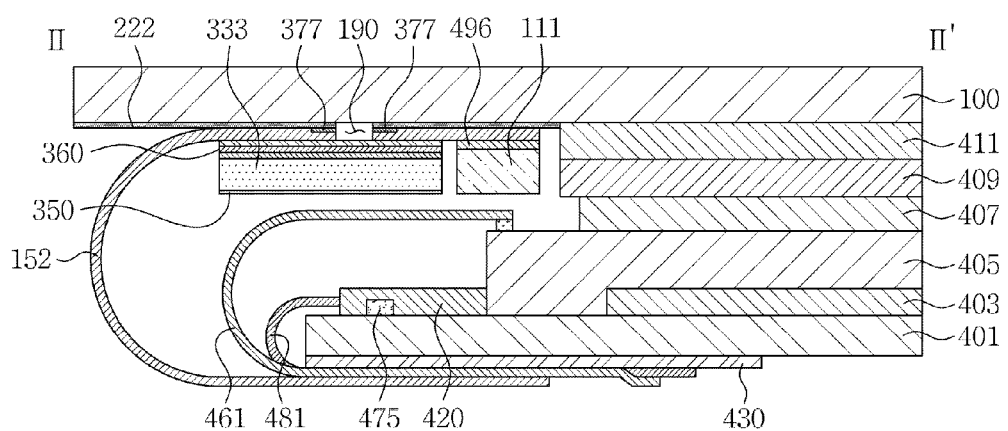
FIG. 4 is a cross-sectional view of one embodiment of the present invention taken along line II-II' of FIG. 1.

FIG. 4 is a cross-sectional view taken along line II-II' of FIG. 1 and includes not only the window 100 but also representative components of a display device, which are located under the window 100.

As illustrated in FIG. 4, a display device according to an embodiment of the present invention includes a first substrate 401, a display unit 403, a second substrate 405, a touch sensor 407, a polarizer 409, an adhesive layer 411, a main PCB 481, a touch panel PCB 461, and a driving unit 475. The first substrate 401, display unit 403, and second substrate 405 are collectively called a display panel.

The first substrate 401 may be divided into two areas: a display area and a pad area. The first substrate 401 may be made of a transparent material (such as a silicon oxide ($SiO_2$)-based glass material), but embodiments of the present invention are not limited thereto. The first substrate 401 may also be made of a transparent plastic material. A plurality of pixels are located in the display area of the first substrate 401 so as to display images, and one or more driving units 475 may be located in the pad area.

The first substrate 401 may further include a scan driver and a data driver that are configured to drive the pixels. Further, the first substrate 401 may further include pad electrodes in the pad area. The driving unit 475 may be mounted in the pad area of the first substrate 401 by a chip-on-glass (COG) method so as to be electrically coupled to (e.g., electrically connected to) the pad electrodes. The first substrate 401 may further include wires configured to connect the driving unit 475, the scan driver, and the data driver together. However, the driving unit 475 may be located outside the pad area or may be omitted. A desiccant (or moisture-proof agent) 420 configured to protect the driving unit 475 from external impact may be further located in the pad area. The driving unit 475 may be a driver integrated circuit (IC).

The display unit 403 may be located on the first substrate 401 and may be coupled to (e.g., connected to) the driving unit 475. The display unit 403 may include an organic light emitting diode (OLED). The display unit 403 may include another element that serves as a display element besides the OLED. In an embodiment, for example, the display unit 403 may include a liquid crystal in place of the OLED.

When the display unit 403 includes the OLED, the display device according to an embodiment of the present invention is an OLED display. On the other hand, when the display unit 403 includes the liquid crystal, the display device according to an embodiment of the present invention is a liquid crystal display (LCD).

The second substrate 405 may be opposite to (i.e., may face) the first substrate 401 and may be bonded to (e.g., combined with) the first substrate 401 by a sealant (not shown). The second substrate 405 may be configured to cover the display unit 403 for protection. The second substrate 405 may be made of glass or a transparent, synthetic resin film (such as an acryl) and, further, metals may be included in the second substrate 405. For instance, the second substrate 405 may be made of any one of polyethylene (PET) film, polypropylene (PP) film, polyamide (PA) film, polyacetal (POM or polyoxymethylene) film, poly (methyl methacrylate) (PMMA) film, polybutylene terephthalate (PBT) film, polycarbonate (PC) film, cellulose film, and/or moisture-proof cellophane.

The second substrate 405 may be smaller in area than the first substrate 401. Therefore, the pad area of the first substrate 401 may not be covered by the second substrate 405. Further, the second substrate 405 may be a sealing member and may have a thin film structure in which an organic layer and an inorganic layer are alternately laminated.

A conventionally or generally used sealant (e.g. a sealing glass frit) may be utilized as the sealant.

The touch sensor 407 may be located on the second substrate 405 corresponding to the display area of the first substrate 401. The touch sensor 407 may include first and second electrodes that cross (e.g., intersect) each other. The first and second electrodes may correspond to a touch sensor pattern. The first and second electrodes may be located on the second substrate 405 in a matrix form and may have an on-cell structure in which the first and second electrodes are patterned directly on a pixel of the second substrate 405. The on-cell structure may be applied when the second substrate 405 is used as a sealing member. In an implementation, when the display device according to an embodiment of the present invention is an OLED display, the second substrate 405 may be utilized as the sealing member.

In one embodiment, the touch sensor 407 may be a separately manufactured touch panel and may be located on the second substrate 405. The separately manufactured touch panel may be applied when patterns are already formed on a surface of the second substrate 405. For instance, when the display device according to an embodiment of the present invention is an LCD, patterns such as a black matrix or a color filter may be formed on a surface of the second substrate 405.

The touch sensor 407 may include a touch pad unit 450 on the second substrate 405. The touch sensor 407 may detect touch performed by, for example, a pen and/or a user's finger and may transmit a signal corresponding to a position where the touch is performed to a touch controller. The touch sensor 407 may be used as an input to a display device and may be resistive or capacitive.

The polarizer 409 may be located between the window 100 and the touch sensor 407. The polarizer 409 may be configured to reduce or effectively prevent reflection of ambient light.

The adhesive layer 411 may be located between the window 400 and the touch sensor 407 and may be configured to improve luminance, transmittance, reflectance, and visibility of a display device. Further, the adhesive layer 411 may prevent an air gap from being formed between the window 400 and the first substrate 401 and between the window 400 and the second substrate 405 and may also prevent foreign matter such as dust from penetrating into the display device. The adhesive layer 411 may include resin. The resin may be a photo-curable resin. Hereinafter, the resin will be described as the adhesive layer 411.

A curing process of the resin 411 is as follows. An amount (e.g., a relatively small amount) of a photoinitiator, which is included in the resin 411, may be exposed to, for example, ultraviolet (UV) light such that a photo-polymerization reaction may be initiated. Then, a monomer, which is a primary element of a resin-forming composition, and an oligomer may be polymerized (e.g., instantaneously polymerized) to be cured. The monomer and the oligomer, which are primary elements of the resin 411, may be in (e.g., may be deposited in) a liquid state because they have low molecular weight, whereas the cured polymer may have a solid state (e.g., a rigid state), because it has high molecular weight. Therefore, the liquid (e.g., the coated resin or ink) may be cured to be a solid (e.g., a polymer).

The main PCB 481 may be folded towards the back of the first substrate 401 at one side of the main PCB 481 while being connected to the pad area of the first substrate 401. A flexible printed circuit may be used as the main PCB 481.

The touch panel PCB 461 may be folded towards the back of the first substrate 401 at one side of the touch panel PCB 461 while being connected to the touch pad unit 450 of the second substrate 405. The opposite side of the touch panel PCB 461 may be coupled to the main PCB 481. A flexible printed circuit may be used as the touch panel PCB 461.

The main PCB 481 and the touch panel PCB 461 may be attached to the back of the first substrate 401 utilizing a double-sided tape 430.

The touch key PCB 152 may be bent (folded) in the direction of the back of the first substrate 401 so as to be connected to the touch panel PCB 461. In this case, the touch key PCB 152 may be connected to a touch controller included in the touch panel PCB 461.

The touch controller may be configured to generate control signals required for the touch electrodes 377 and the touch sensor 407 and may also be configured to determine whether or not a touch is performed and calculate touch coordinates based on sensing signals received from the touch electrodes 377 and the touch sensor 407. Further, the touch controller may control operations of the light source 313 in accordance with whether or not a touch is performed.

The shielding layer 111 may be located between the adhesive layer 411 and the touch key backlight unit 167. In detail, the shielding layer 111 may be located between the adhesive layer 411 and the light guide plate 333. In one embodiment, at least a portion of the shielding layer 111 may be located between the touch key PCB 152 and the second substrate 405. Further, a part of a surface of the shielding layer 111 on the second substrate 405, which directly faces the second substrate 405, may have a larger area than the other part of the surface of the shielding layer 111 on the second substrate 405, which does not face the second substrate 405.

The shielding layer 111 may be attached to the touch key PCB 152 utilizing an adhesive member 496.

A distance between the light guide plate 333 and the shielding layer 111 may be smaller than a distance between the shielding layer 111 and the adhesive layer 411.

In one embodiment, as illustrated in FIG. 2, a length of the shielding layer 111 may be greater than or equal to that of the touch key backlight unit 167, thereby substantially reducing infiltration of an adhesive material included in the adhesive layer 411 into the touch key backlight unit 167.

The shielding layer 111 may include polyethylene terephthalate.

Figure 5:
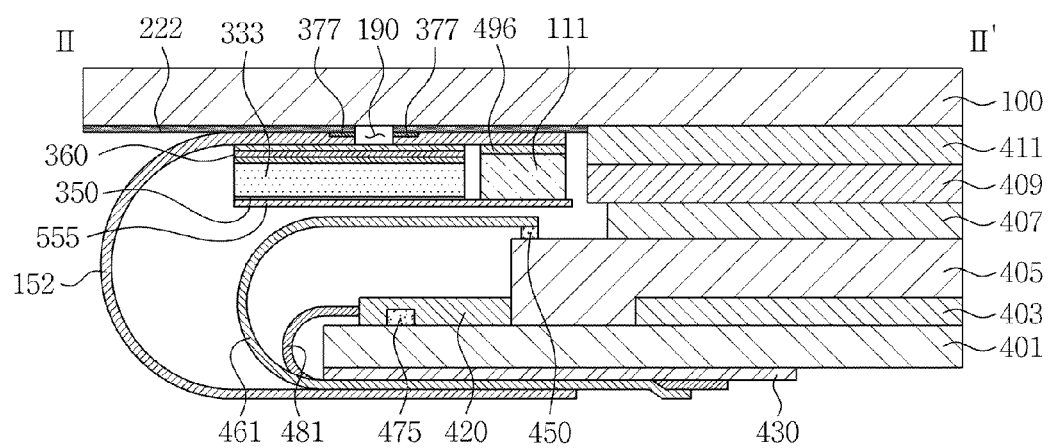
FIG. 5 is a cross-sectional view of another embodiment of the present invention taken along line II-II' of FIG. 1.

FIG. 5 is a cross-sectional view taken along line II-II' of FIG. 1 of another embodiment of the present invention and includes not only the window 100 but also representative components of a display device, which are located under the window 100.

Referring to FIG. 5, a cover tape 555 may be further located on the reflective sheet 350 and on the shielding layer 111. The other components of FIG. 5, which are not described hereinbelow, are consistent with those of FIG. 4, and thus descriptions of the other components of FIG. 5 will be omitted.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims and equivalents thereof.

What is claimed is:

1. A display device comprising:
   a display panel;
   a touch sensor on the display panel;
   a window on the touch sensor;
   an adhesive layer between the window and the touch sensor;
   a touch key printed circuit board at least partially located between the window and the display panel;
   a touch key backlight unit on the touch key printed circuit board; and
   a shielding layer between the touch key printed circuit board and the display panel, wherein the shielding layer does not contact the display panel.

2. The display device of claim 1, further comprising an adhesive member between the shielding layer and the touch key printed circuit board.

3. The display device of claim 1, wherein the shielding layer comprises polyethylene terephthalate.

4. The display device of claim 1, further comprising a cover tape on the shielding layer and on the touch key backlight unit.

5. The display device of claim 1, wherein the touch key backlight unit comprises:
   a light source;
   a light guide plate configured to receive light emitted from the light source on one surface thereof and to emit the light through the opposite surface thereof;
   an optical sheet on the light guide plate; and
   a reflective sheet under the light guide plate.

6. The display device of claim 1, wherein the shielding layer is thicker than the adhesive layer.

7. The display device of claim 1, further comprising a polarizer between the display panel and the window.

8. The display device of claim 1, wherein the display panel comprises:
   a first substrate comprising a display area and a non-display area;
   a second substrate opposite the first substrate; and
   a display unit between the first and second substrates.

9. The display device of claim 8, wherein the display unit comprises any one of a liquid crystal and an organic light emitting element.

10. The display device of claim 8, wherein the touch sensor is patterned on the second substrate.

11. The display device of claim 8, wherein the touch sensor is located on the second substrate.

12. The display device of claim 1, wherein the shielding layer is directly coupled to the touch key printed circuit board by an adhesive.

13. A display device comprising:
   a display panel;
   a touch sensor on the display panel;
   a window on the touch sensor;
   an adhesive layer between the window and the touch sensor;
   a touch key printed circuit board at least partially located between the window and the display panel;
   a touch key backlight unit on the touch key printed circuit board; and
   a shielding layer between the touch key printed circuit board and the display panel;
   wherein the touch key backlight unit comprises:
   a light source;
   a light guide plate configured to receive light emitted from the light source on one surface thereof and to emit the light through the opposite surface thereof;
   an optical sheet on the light guide plate; and
   a reflective sheet under the light guide plate;
   wherein the shielding layer is longer than the light guide plate.

* * * * *